April 2, 1968
M. CONGY
3,375,632
REINFORCEMENT ELEMENT FOR BEAMS AND POLES
MADE FROM REINFORCED CONCRETE
Filed March 3, 1965
3 Sheets-Sheet 1
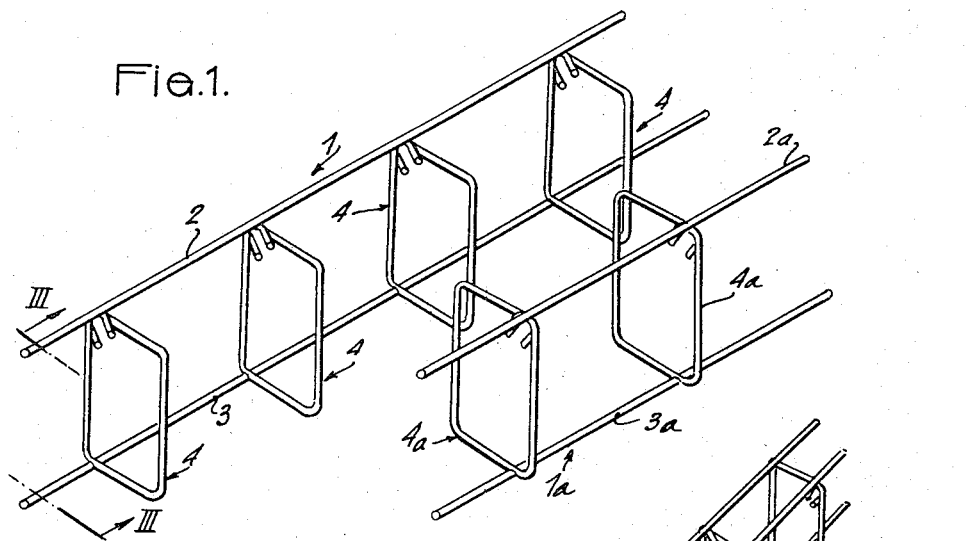
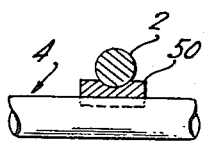
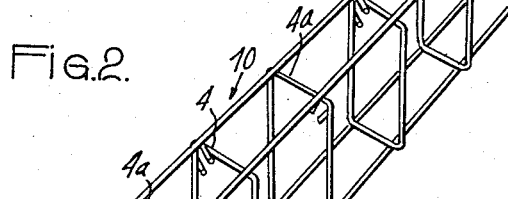
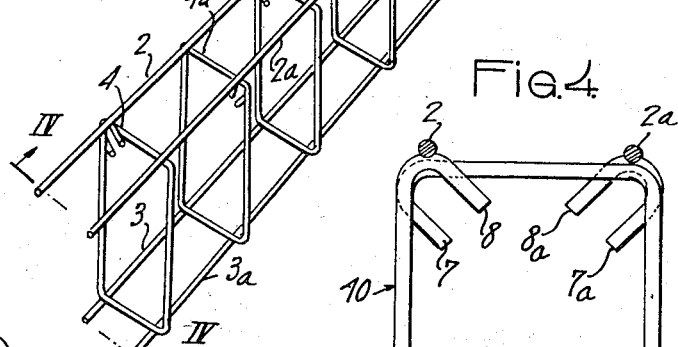
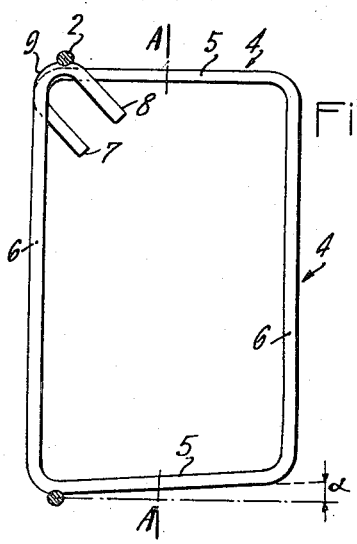
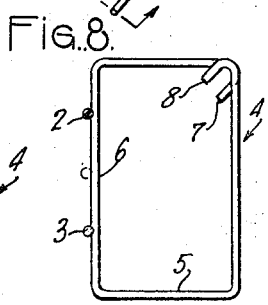
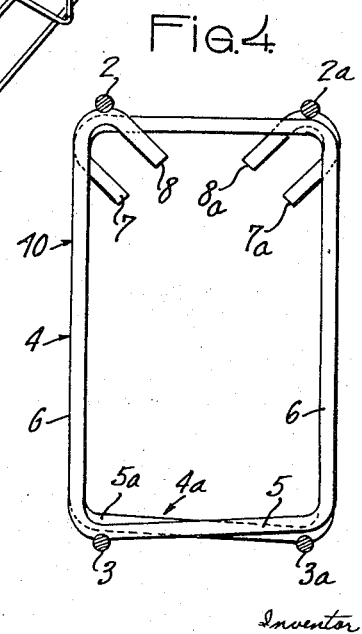
Inventor
Marcel Congy
By Alvin Browdy
Attorney

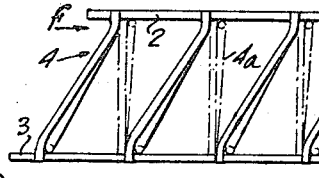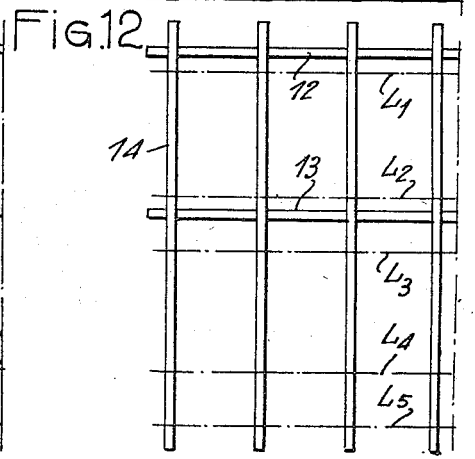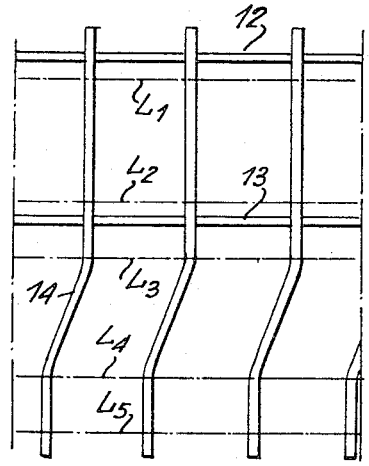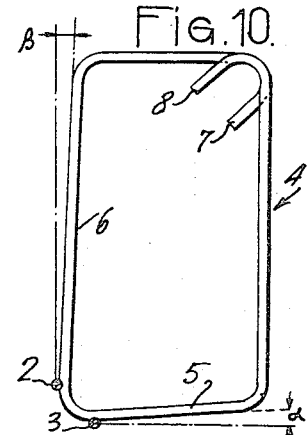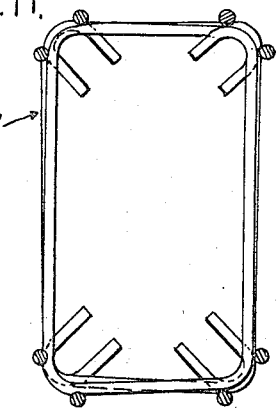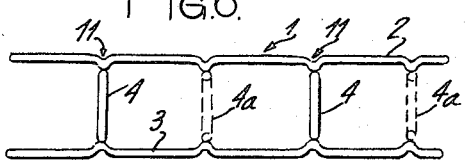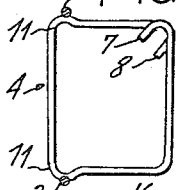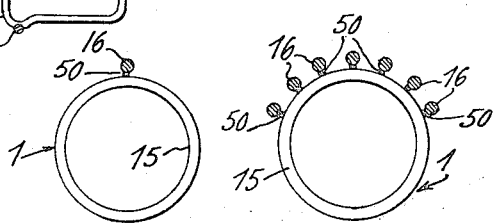

April 2, 1968     M. CONGY     3,375,632
REINFORCEMENT ELEMENT FOR BEAMS AND POLES
MADE FROM REINFORCED CONCRETE
Filed March 5, 1965     3 Sheets-Sheet 3
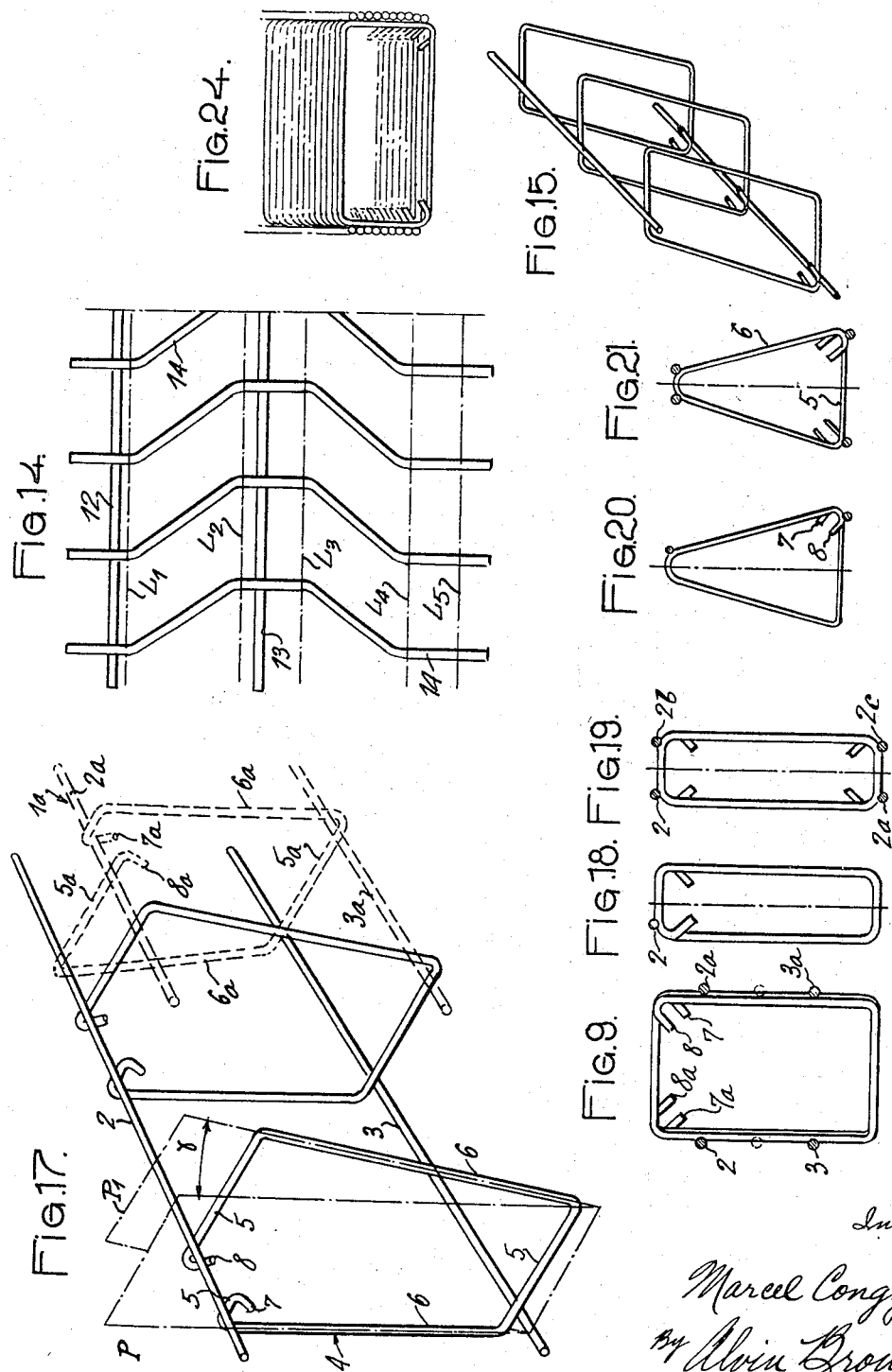

United States Patent Office 3,375,632
Patented Apr. 2, 1968

3,375,632
REINFORCEMENT ELEMENT FOR BEAMS AND POLES MADE FROM REINFORCED CONCRETE
Marcel Congy, 180 Blvd., St. Germain, Paris 6, France
Filed Mar. 3, 1965, Ser. No. 436,854
Claims priority, application France, Dec. 23, 1964, 999,828; Mar. 6, 1964, 966,472
18 Claims. (Cl. 52—648)

ABSTRACT OF THE DISCLOSURE

The present disclosure relates to a reinforcement element for beams and poles made of reinforced concrete and, more particularly, to nestable, prefabricated reinforcing elements which may be joined together at the site of its use, and the method of fabricating such reinforcing elements. The reinforcing elements are elongated bodies having a plurality of spaced generally annular frames joined together by longitudinal bars which are disposed toward one side of each of the frames, i.e., if the frames are divided into two generally equal portions by a geometric longitudinal axis passing therethrough, the longitudinal bars of each element will always be in only one of the two generally equal portions. By providing the longitudinal bars along only one portion of the reinforcing element, it is possible to simply inter-engage two or more such elements at the site of its use. The elements are fabricated by starting with a planar lattice or grid of the longitudinal bars and lateral rods and then bending the lateral rods to form the generally annular frames.

---

The reinforcements for beams and poles of reinforced concrete are generally constituted by transverse frames and longitudinal bars both assembled either by iron wire lashings or by weldings on the job, according to a geometrical pattern which is desired so as to present, more particularly, a constant or variable spacing of the transverse frames.

Such constructions, which are relatively costly and very much time consuming, have sometimes been replaced by reinforcement elements prefabricated in the form of welded and folded lattices, but the latter have not been entirely satisfactory. Indeed, such prefabricated reinforcements are cumbersome and have constant characteristics which consequently necessitate that some modifications be made on the job as a function of the intended particular use therefor. It is more particularly necessary to provide as often as not complementary reinforcement members in certain zones of the prefabricated reinforcement elements, for example a greater density of transverse frames in certain important zones, or tilted steel sections able to withstand and absorb the strains and efforts exerted in use on the finished member made from reinforced concrete.

The present invention eliminates the above-mentioned drawbacks in providing a new reinforcement element which may be used for reinforced concrete poles as well as for reinforced concrete beams, and may be commercially pre-made and assembled to other complementary elements so that the construction and mechanical characteristics required for the finished beams and poles are taken into consideration.

According to this invention, the reinforcement element is constituted by partly parallel equidistant transverse frames, connected to at least one longitudinal bar which is made integral with said frames in such a manner that the bar is disposed to one side of a reference line passing through the geometrical longitudinal center of the frames.

According to another feature of this invention, the reinforcement element is constituted by rectangular transverse frames having two longitudinal bars integral with one side of each 4-sided frame so that the bars are disposed on one portion of the frames, such one portion being defined by a straight line passing through the geometric longitudinal center of the frames and dividing the frames each into two portions of equal size.

Various other features of this invention will appear when reading the following detailed description with reference to the accompanying drawings which show in an illustrative and by no means limitative manner some embodiments of the invention, and in which:

FIG. 1 is a fragmentary view in perspective of a reinforcement element according to this invention.

FIG. 2 is a fragmentary view in perspective of a composite reinforcement constituted by the assembly of elements according to this invention.

FIG. 3 is a cross-section at a larger scale taken substantially along the line III—III in FIG. 1.

FIG. 4 is a cross-section at a larger scale taken along the line IV—IV in FIG. 2.

FIG. 5 is a fragmentary sectional view at a larger scale showing a detail of the reinforcement element.

FIG. 6 is a view partly in elevation and partly in section of an alternative embodiment of the reinforcement element, with corrugated longitudinal bars.

FIG. 7 is a cross-section showing an alternative embodiment of the invention with a corrugated frame.

FIG. 8 is a cross-section at a smaller scale of an alternative embodiment of the reinforcement element.

FIG. 9 is a cross-section showing a composite reinforcement constituted by the assembly of two elements according to FIG. 8.

FIG. 10 is a cross-section at a larger scale of another embodiment of the reinforcement element.

FIG. 11 is a cross-section showing a composite reinforcement obtained by assembling four elements according to FIG. 10.

FIG. 12 is a fragmentary plane view showing at a smaller scale a method for making the reinforcement element by means of a welded plane lattice.

FIG. 13 is a fragmentary view in elevation showing how a particular shape could be given to the reinforcement element made according to the method illustrated in FIG. 12.

FIG. 14 is a fragmentary plane view illustrating an alternative form of the method according to FIG. 12.

FIG. 15 is a fragmentary view in perspective representing a reinforcement made according to the method of FIG. 14.

FIG. 16 is a fragmentary plane view showing an alternative form of the method according to the invention.

FIG. 17 is a fragmentary view in perspective at a larger scale of a reinforcement element made according to the method illustrated in FIG. 16.

FIGS. 18 to 21 are cross-sections showing other embodiments of the reinforcement element, respectively.

FIGS. 22 and 23 are cross-sections showing two other embodiments of the reinforcement element, respectively, and FIG. 24 is a diagrammatical cross-section illustrating one of the advantages of the reinforcement element according to the present invention.

Turning now to the drawings, and more particularly to FIG. 1, it can be seen that the illustrative embodiment of the reinforcement element according to this invention, generally designated by the reference number 1, is particularly intended to make a reinforced concrete beam or pole having a rectangular cross-section. The element 1 comprises at least one longitudinal bar, and preferably two longitudinal bars, 2 and 3 made integral, through a resistance electrical welding together with a pressure applied thereto, with a number of identical transverse and generally annular frames 4 extending in parallel equidistant planes at right angles to the common plane of the longitudinal bars 2 and 3. In the example shown, the longitudinal bars 2 and 3 are welded on two of the opposite sides of each frame, but so that they are located on the one and same portion of the frames as shown in FIG. 3 where the frame is shown divided into two equal portions by the line A—A which signifies the geometrical longitudinal axis of the element. In this manner, for constituting a reinforcement for a beam or a pole, the element 1 can be used either as a simple reinforcement element or it can be associated, as shown in FIG. 1, to another like reinforcement element 1a, the transverse frames 4a of which are entirely or partly transversely imbricated and also interposed between the frames 4 of element 1. The connection of the reinforcement elements 1 and 1a is effected by lashings or weldings at the level of the longitudinal bars of the elements and the frames of the complementary element.

Such an assembly may be effected in several different manners to obtain a final composite reinforcement having, in certain zones along its length, determined local strength characteristics. In effect, both reinforcement elements 1 and 1a may be entirely identical, particularly so far as the length thereof is concerned, to constitute, as shown in FIG. 2, a composite reinforcement having a constant character; but, provisions may also be made for associating, e.g. to element 1, complementary elements 1a substantially shorter in length relatively thereto. In the latter case, the elements 1a may be assembled to the end parts of element 1, or they may be assembled in a particularly desired zone to increase at the density, e.g. number, of the transverse frames and thus impart to the thus obtained reinforcement such mechanical characteristics as are desired; these mechanical characteristics will be related to the future use of the realized construction as well as to the efforts and strains which said construction must withstand, for example to resist the shearing efforts near the supports of the beams.

Since the mode of assembling the transverse frames and the longitudinal bars, in the case of a resistance electrical welding with pressure, results in causing a mutual partial housing, it is necessary to shape the constitutive members of each reinforcement element so that the transverse frames of the complementary element or elements may afterwards engage and imbricate in a satisfactory manner.

FIG. 3 shows, as an example, such an assembling mode according to which each frame 4 is constituted by a metal bar or rod including successive foldings intended to form corner angles, as well as the transverse sides 5 and the longitudinal sides 6 of the finished generally annular frame. The end parts 7 and 8 of the frame bar which are extensions of the adjacent sides 5 and 6 are folded according to a radious of curvature which is determined so that these end parts extend to the inside of the defined generally annular frames. However, one of said end parts, e.g. the part 8, is curved so that it protrudes relatively to part 7, e.g. extending above, to support the longitudinal bar 2, in the general area of the top 9 formed therein; as mentioned above, the bar 2 is joined to the frame at 9 by a resistance electrical welding with pressure. The longitudinal bar 2 is thus located in a plane raised with respect to the corresponding transverse side 5, i.e., above the side 5 which is shown in phantom below the bar 2, which side 5 may therefore easily be engaged under the bar 2a of a complementary reinforcement element 1a.

The bar 3, according to the arrangement shown in FIG. 1, is made fast to the frames 4, on the same side as the bar 2 with respect to the straight line comprising the geometrical center of the frame, which in the present case constitutes the axis A—A, but at the level of the opposite transverse side 5. The latter side 5 extends at an angle α relatively to the plane parallel to the homologous side so that the longitudinal bar 3a of a complementary element 1a may pass freely thereunder as shown in FIG. 4. An arrangement such as above-described allows easy imbrication of the two reinforcement elements 1 and 1a, which are then connected one to the other on the job, if desired to form a final composite reinforcement 10 having the shape as shown in FIG. 4. According to FIG. 4, it will be noticed that the projections of the transverse frames 4 and 4a in a plane at right angles to the bars virtually coincide, while the sections of the longitudinal bars 2, 3, 2a and 3a define a theoretical rectangle.

So that at least two reinforcement elements as above-described may engage one with the other, there may also be interposed, between the frames 4 and the longitudinal bars 2 and 3 of each element, filling or spacing members 50 (FIG. 5) having a determined thickness and intended to form compensating members avoiding the mutual imbricating upon the operations of the resistance electrical welding under pressure.

FIG. 6 shows an alternative embodiment according to which each of the longitudinal bars 2 and 3 is corrugated such as at 11, along its length adjacent its connection with each of the frames 4. The corrugations 11 are also formed so that those parts of the bars which extend between two successive frames 4 have a sufficient spacing to allow the engagement of the frames 4a of a complementary element shown in dash lines in FIG. 6.

In some cases, the corrugations 11 may be provided directly on the frames 4 (FIG. 7), and they are then made so that they protrude outside of the general contour to support the longitudinal bars 2 and 3.

It has been mentioned above that the bar members 2 and 3 of each element are located on the same side of a straight line comprising the geometrical center of the frames to allow the engagement and the partial or total penetration by the frames 4a of a complementary element 1a. In the example shown more particularly in FIG. 3, the bars 2 and 3 are made fast to the transverse sides 5 of the frame member at the level of angles located on one and the same side of the axis A—A. It is evident that other arrangements may be provided, particularly for impact resistance of the reinforcement, which is to be realized by associating at least two reinforcement elements 1 and 1a which thereby provides rigidity as well as strength in relation with the use thereof. Thus, the bar members 2 and 3 may be placed on one and the same side of the frames 4 as shown in FIG. 8 which shows also in phantom that the reinforcement element may comprise a higher number of longitudinal bars. In such a case, the assembly of two complementary reinforcement elements provides a composite reinforcement having in section the shape as shown in FIG. 9. It is evident that the longitudinal bar members may also be disposed within the frames although, in such a case, the superimposition of the frames of two reinforcement elements is no longer perfect. As shown in FIG. 10, the bars 2 and 3 may also be disposed on two contiguous sides 5 and 6, but respectively each on one and the same side of the frame. Such an arrangement may be advantageous when it is desired to make a composite reinforcement 10 (FIG. 11) comprising more than two reinforcement elements. In such a case, the frames 4 of each element are so shaped that the sides 5 and 6, supporting the bars 2 and 3, extend respectively along a convergent plane defining with the plane of the parallel homologous side an angle α and β, respectively. Also, the bars 2 and 3 are preferably made fast with that corner of frame 4 which is diametrically opposite to the corner formed by the internally folded parts 7 and 8.

Although not shown, the end parts 7 and 8 may be internally folded in defining an angle different from the one illustrated diagonally opposite to the bars 2 and 3, or they may be along any side of the frame. In like manner, the end parts may be maintained in the same alignment whereby to be directly connected by butt welding or by lateral overlapping.

It is thus possible to make a composite reinforcement 10, as shown in FIG. 11, constituted at least in some of the zones thereof, by the assembly of four identical and mutually imbricated reinforcement elements. As clearly visible in FIG. 11, the arrangement and orientation of said four reinforcement elements is provided so that the end parts 7 and 8 of each of the latter are disposed at the level of one of the angles of the resulting rectangle defining the section of said reinforcement 10. As in the example described relatively to FIG. 4, it is to be noticed that the projections of the superimposed frames of the four reinforcement elements virtually coincide, while the bar members 2 and 3 of these elements are exactly inscribed within a theoretical rectangle in being disposed on either side of each angle of the resulting rectangle defining the reinforcement section.

FIG. 12 shows how it may be advantageous to proceed to commercially make a prefabricated reinforcement element 1 in a quick and economical manner. According to said FIG. 12, which more particularly applies to the manufacture of a reinforcement element 1 as described in relation to FIGS. 1 to 3, there is used a portion of welded rectangular mesh lattice, constituted by two rods 12 and 13 parallel to each other and adapted to form the bar members 2 and 3, and by perpendicular rods 14 adapted to form the frame members 4. This lattice portion, shown in plane in FIG. 12, is folded or bent over itself along five folding lines $L_1$, $L_2$, $L_3$, $L_4$ and $L_5$, schematically represented in dot-and-dash lines which are parallel to said rods 12 and 13. These folding operations have for their object to shape the rods 14 so that the portions of each of these rods which are located between the lines $L_1$ to $L_5$ define the four sides of a rectangular frame, each of the lines correspond to a corner of the frame 4, while the portions extending beyond the lines $L_1$ to $L_5$ are curved inwardly to the frame so built as to constitute the parts 7 and 8.

Such a making method, in addition to allowing a quick and cheap commercial fabrication, has also other advantages, and more particularly reinforcing possibilities according to the characteristics required for the composite reinforcement. In effect, the reinforcement element made according to the above method may afterwards be given a permanent axial distortion as shown in FIG. 13 which is obtained by exerting on the different successive frames 4 a force in the direction of the arrow *f* tending to cause a relative parallel displacement of the longitudinal bar 2 with respect to the bar 3. The distortion of the rods 14 is effected remotely from the weldings as shown in FIG. 13, so that the latter are not mechanically stressed. This results in reducing the transverse distance between the bar members 2 and 3, and in tilting, for example, the largest sides 6 of the frames 4 with respect to said bar members.

Such a reinforcement element, as shown in FIG. 13, may then be partly or entirely associated with a reinforcement element 1a whose frames 4a having a perpendicular relationship with the corresponding bars, have, of course, a height in relation with the new spacing of the bars 2 and 3 of the distorted reinforcement element. In this manner, when the reinforcement elements 1 and 1a have become engaged and made fast one with the other, there is obtained a composite reinforcement including four longitudinal bars integral with the transverse frames 4a which are reinforced by tilted frames 4, this insuring a triangular pattern and noticeably increasing the characteristics of the shearing effort resistance of the composite reinforcement.

In another embodiment of the above-described method, it is also possible to use a portion of the welded lattice which is shown in the plane view of FIG. 14. According to this method, it will be noticed that those portions of the rods 14, which must constitute, for example, the longitudinal sides 6 of the frames 4, initially extend relatively to the axis of the rods 12 and 13 according to an angle substantially corresponding to the slope required for said sides of the constructed reinforcement element. Such an arrangement may be obtained either by a permanent relative distortion applied to the rods 12 and 13 of a portion of lattice having rectangular meshes, or by providing a portion of lattice by means of straight rods 12 and 13 and of previously shaped rods 14. The used portion of lattice is, of course, submitted, as mentioned above, to successive folding operations along the lines $L_1$ to $L_5$ whereby to obtain a reinforcement element as shown in FIG. 15 wherein the frame sidewalls are inclined.

Another embodiment of the above method is illustrated in FIG. 16. According to the latter the portion of lattice 11 is given, before or during the folding operation, a permanent distortion which is localized at those portions of the rods 14 which extend beyond the straight line 13.

As in the alternative embodiment of the method above-described, it is also possible to use a portion of welded lattice which is constituted by the assembly of straight rods 12 and 13 and of preshaped rods 14.

The lattice portion which is used is folded along the lines $L_1$ to $L_5$ whereby to form a reinforcement element as shown in FIG. 17. According to the latter, it will be noticed that each frame 4 of the element 1 constructed includes two transverse parallel sides 5, a longitudinal perpendicular side 6 connecting the longitudinal bars 2 and 3, and a second longitudinal side 6 which extends along a tilted transverse plane $P_1$ which defines an angle $\alpha$ with the initial plane P of frame 4. This embodiment permits the imbrication of two identical reinforcement elements 1 and 1a to constitute a composite reinforcement 10 of which two parallel faces include, between the corresponding bars 2 and 3 or 2a and 3a, frame members which are successively perpendicular and tilted with respect to said bars, the frame members of one of said faces being oriented along a direction opposite to the tilted frame members of the parallel homologous face whereby to form in projection a reinforcement crossed lattice. This imparts to the constructed reinforcement an increased strength to withstand the various efforts to be applied thereto.

As may be seen from the foregoing, the methods described with reference to FIGS. 12, 14 and 16 provide reinforcements made from a lattice and partly or entirely reinforced by triangulation struts without it being necessary to add manually independent transverse reinforcement elements.

In the foregoing, there was mentioned that the reinforcement elements 1 are constructed so that to include rectangular transverse frames 4. It is evident that these frames may have other shapes, such as the shape illustrated in FIG. 18, in which the frames have an oblong section and are connected together by a single bar 2 which is offset by at least one-half of its thickness relatively to the longitudinal median axis. Such a reinforcement element may be associated with one, two or three identical complementary elements (see FIG. 19).

FIG. 20 shows that the frames may also have a generally triangular configuration and, in such a case, the bar members 2 and 3 are advantageously disposed on one and the same side of the median axis. The assembling of such reinforcement elements makes possible to obtain a composite reinforcement such as shown in FIG. 21.

According to FIG. 22, the frames may also have a circular contour, as shown by the reference 15, and include one or several longitudinal bars 16. In such a case, it is possible (FIG. 23) to imbricate an important number of elements 1 corresponding to the number for which the bars 16, initially disposed in a side-by-side relationship, cover an angular reach less than 180°, in the case where the bars are made fast to the frames, with spacers 50 interposed therebetween. These elements are afterwards offset to distribute in an equidistant arrangement the bars 16 which are made fast to the frames 15 of the other elements, as by a welding or lashing operation.

In addition to the various advantages hereinbefore mentioned, it is to be noticed that the particular structure of the reinforcement elements, according to the present invention, considerably facilitate the conveyance and storage of the prefabricated reinforcement elements. In effect, as illustrated by FIG. 24, it is possible through a nesting operation, to stack or superimpose several identical elements whereby to noticeably reduce the overall volume and bulkiness of the latter.

It is to be understood that this invention is not limited to the embodiments described and shown in the drawings, and that various changes or modifications may be brought thereto without going outside of its scope as defined in the appended claims.

What I claim is:

1. A prefabricated reinforcing element for the reinforcement of concrete beams and poles comprising
    at least one longitudinal bar adapted to pass along the axial length of the beam or pole to be reinforced, and
    a plurality of parallel frame members generally transverse to and spaced equidistantly along the length of said bar and rigidly connected thereto, each of said frame members comprising a rod bent to form a generally annular shape, and said at least one bar at said rigid connections being located along the outer periphery of said annulus and along only one portion of two substantially equal portions of each of said annular frame members, said two equal portions being defined by a geometric longitudinal axis passing through said parallel frame members.

2. An element in accordance with claim 1 wherein said annular transverse frames are substantially rectangular.

3. An element in accordance with claim 2 wherein said bars are welded to said frames and have spacers interposed therebetween.

4. An element in accordance with claim 1 wherein said at least one bar is corrugated along its length.

5. An element in accordance with claim 1 wherein said frames are provided each with at least one corrugation upon which said at least one bar is attached thereto.

6. An element in accordance with claim 1 wherein each said frame comprising a bent rod further comprises end parts folded inwardly to project within the annular space within said frame, one of said end parts being curved to provide a convex portion the top of which projects beyond the periphery of the other end portion, and wherein said bar is attached to the projecting portion of said one end portion.

7. An element in accordance with claim 2 wherein one of the sides of said rectangular frame converges with respect to the opposite side of said frame, each said side defining a transverse plane being inclined at an angle from one another.

8. An element in accordance with claim 2 comprising two said longitudinal bars both attached to one of the four sides of each said frame.

9. An element in accordance with claim 2 comprising two said longitudinal bars both attached to each said frame adjacent one of the four corners and along a different side of the four sides thereof.

10. An element in accordance with claim 2 comprising two said parallel longitudinal bars both attached to each said frame along opposite sides thereof.

11. An element in accordance with claim 10 wherein said frames are inclined at an angle other than 90° between said parallel bars.

12. A package convenient for shipping and storage comprising a plurality of elements in accordance with claim 1, said elements being in nested relationship.

13. Reinforcement for concrete beams and poles comprising at least a pair of elements in accordance with claim 1, said elements being attached so that the at least one longitudinal bar of one said elements is disposed within one portion of the reinforcement while the at least one longitudinal bar of the other said element is disposed within the other portion of the reinforcement, the two portions being defined by a geometric longitudinal axis passing through said parallel frame members.

14. An element in accordance with claim 2 wherein one side of the four sides of each said frame is slightly inclined within the plane of said frame so that its two adjacent sides opposite one another are of slightly different lengths, and wherein said longitudinal bar is attached to said frames along said inclined side near the corner forming the juncture between said inclined side and the longer of the two opposite sides.

15. An element in accordance with claim 14 comprising two said longitudinal bars near said corner, and wherein said longer side of said two opposite sides of each said frame is also slightly inclined within the plane of said frame so that the first of said inclined sides is longer than its opposite side, the second of said longitudinal bars being attached to said frames along the second of said inclined sides.

16. A method for making a reinforcement element for concrete beams and poles comprising
    providing a welded lattice in planar form having at least one longitudinal bar and a plurality of parallel rods generally transverse to and spaced equidistantly along the length of said bar; and
    bending said parallel rods out of the plane of said lattice to form a generally annular frame of each said rod, each frame being generally perpendicular to said bar.

17. A method in accordance with claim 16 wherein said lattice comprises at least two longitudinal bars, further comprising first axially moving one of said bars with respect to the other to deform said parallel rods within the plane of said lattice prior to bending thereof.

18. A method in accordance with claim 16 wherein said parallel rods are pre-shaped within the plane of said lattice.

References Cited

UNITED STATES PATENTS

| 1,011,104 | 12/1911 | Bates | 52—648 X |
| 1,045,006 | 11/1912 | Edwards | 52—648 |

FOREIGN PATENTS

| 587,059 | 4/1925 | France. |
| 1,110,402 | 2/1956 | France. |
| 766,259 | 1/1957 | Great Britain. |
| 610,820 | 10/1960 | Italy. |

CASMIR A. NUNBERG, *Primary Examiner.*

FRANK L. ABBOTT, *Examiner.*

RAYMOND D. KRAUS, G. W. HORNADAY,
*Assistant Examiners.*